United States Patent Office 2,929,278
Patented Mar. 22, 1960

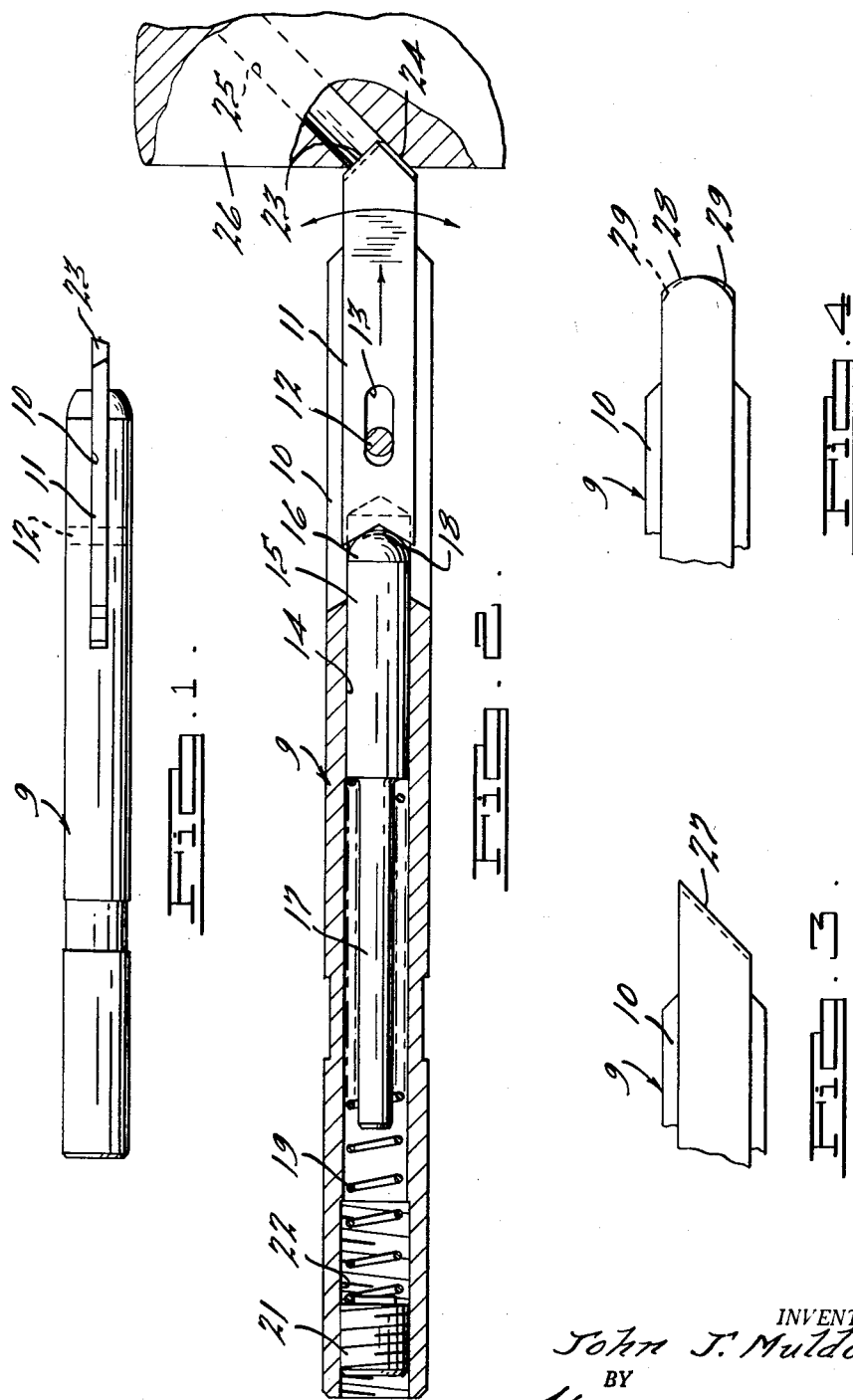

2,929,278

RETRACTABLE DEBURRING TOOL

John Joseph Muldoon, Southfield Township, Oakland County, Mich., assignor to Cogsdill Tool Products, Inc., Detroit, Mich., a corporation of Michigan Application May 2, 1956, Serial No. 582,223

5 Claims. (Cl. 77—73.5)

This invention relates to deburring tools, and particularly to a tool for deburring the mouth of an aperture extending into the body of a cylindrical member.

Deburring tools have been provided heretofore in the art for deburring the metal from the mouth of an aperture in a flat workpiece. Such tools, however, were not satisfactory for deburring the metal at the end of an aperture which is formed in a cylindrical object. The intersection of the aperture with the cylindrical surface produces an oval-shaped aperture which is difficult to burr with the standard type of tool. This is especially true if the hole is drilled at an acute angle to the surface, such as an oil hole in a bearing surface of a crankshaft.

The tool of the present invention comprises a hollow body element of cylindrical form having a slot at one end of sufficient width to receive a blade which is pivoted therein. The blade has a slot extending over the pivot so that it may reciprocate as well as pivot within the slot. The blade has a recess on the inner end into which a ball end of a plunger projects when urged with a predetermined pressure by a spring, the tension of which may be adjusted by a threaded screw in the rear end of the body element. A cutting edge is provided on the projecting end of the blade which may consist of two portions in angular relation to each other or which may be disposed upon an arc, or which may be a straight edge disposed angularly to the length of the blade. When the cutting end is inserted in the aperture to be deburred, the blade is free to swing sidewardly and to move backwardly or forwardly to have the cutting edge follow the intersecting edge of the aperture with the cylindrical surface which is intersected thereby.

Accordingly, the main objects of the invention are: to provide a deburring tool having a blade supported for lateral and forward and rearward movements; to provide a deburring tool having a pivoted blade which may swing sidewardly and which may be moved backwardly and forwardly, controlled by the pressure of a spring on a plunger which engages the rear portion of the blade; to provide a blade which may be moved laterally and forwardly and rearwardly, with a cutting edge so disposed as to follow the intersecting edge of an aperture with a cylindrical surface of the workpiece, and, in general, to provide a deburring tool which is simple in construction, positive in operation, and economical of manufacture.

Other objects and features of novelty of the invention will be specifically pointed out or will become apparent when referring, for a better understanding of the invention, to the following description taken in conjunction with the accompanying drawing, wherein:

Figure 1 is a view in elevation of a deburring tool embodying features of the present invention;

Fig. 2 is an enlarged sectional view of the tool illustrated in Fig. 1, taken through the longitudinal center line thereof;

Fig. 3 is a broken view of the cutting edge of the blade and adjacent end of the tool, showing another form of cutting edge, and Fig. 4 is a view of structure, similar to that illustrated in Fig. 3, showing still another form of cutting edge.

The deburring tool has an elongated cylindrical body 9 provided with a slot 10 at the forward end on the center line of the body. A blade 11 is mounted in the slot on a pivot pin 12 which extends through the body. The pivot pin is disposed through a slot 13 in the blade, permitting the blade to move forwardly and rearwardly and swing laterally in the slot 10. The hollow interior 14 in the rear portion of the body 9 has a plunger 15 therein containing a hardened semicylindrical head 16 on the forward end and a stem 17 on the rearward end. The blade 11 has an angular recess 18 at its rearward end which is engaged by the head 16 when a spring 19 about the stem 17 urges the plunger and head forwardly toward the blade 11. A screw 21 having a thread engaging the thread 22 in the inner wall of the body 9 is adjustable therein to regulate tension on the spring.

The forward end of the blade has two cutting surfaces 23 and 24 which are relieved rearwardly to present sharp cutting edges to the burr to be removed. The cutting edges are disposed in angular relation to each other, herein illustrated as in right-angular relation, although it is to be understood that the angular relation may vary depending upon the angular relation of the aperture, such as the aperture 25 to the surface of the cylindrical workpiece 26. When the intersecting edge between the aperture 25 and the cylindrical surface of the workpiece 26 is to be deburred, the tool is placed in a drill or similar rotatable driving device for rotating the body 9 as well as the blade 11. The cutting edge of the blade is then disposed into the mouth of the aperture 25 and as the blade is rotated it may swing sidewardly and move rearwardly and forwardly so that the cutting edges 23 and 24 may follow the intersected edge which is oval or other noncircular shape.

In Fig. 3 a single cutting edge 27 is provided on the forward end of the blade, disclosed in angular relation to the longitudinal length thereof. Such a cutting edge is utilized when such a shaped opening is to be deburred which could not be satisfactorily deburred by the two cutting edges 23 and 24 illustrated on the blade of Fig. 2. In Fig. 4 a blade is illustrated having an arcuate cutting edge 28 which is relieved at 29 on opposite sides of the center and which is capable of following the form of the aperture at the point of intersection with the spherical or other form of workpiece.

Irrespective of the shape of the intersecting end of the aperture with the surface of a nonplanar workpiece, a deburring tool has been provided having a blade so mounted as to be capable of following the shape of the intersecting edge of the aperture to be deburred. By having the blade mounted for swinging movement relative to the axis of the tool and for reciprocation forwardly and rearwardly under a predetermined pressure, the cutting edge will automatically follow the edge to be deburred irrespective of the shape thereof.

What is claimed is:

1. A deburring tool including, in combination, an elongated body member, a blade projecting from the end of said body member and pivotally mounted on said body intermediate the ends of the blade for lateral swinging and forward and rearward movement, and biasing means on said body member directly engaging the end of said blade disposed within the body member for forcing said blade forwardly and resiliently resisting said swinging movement from either side of said body member.

2. A deburring tool including, in combination, an elongated body member, a blade projecting from the end of said body member and pivotally mounted on said body intermediate the ends of the blade for lateral swinging and forward and rearward movement, biasing means on said body member directly engaging the end of said blade disposed within the body member for forcing said blade forwardly and resiliently resisting said swinging movement from either side of said member, and means for adjusting the pressure exerted by said biasing means.

3. A deburring tool including, in combination, an elongated body member, a blade projecting from the end of said body member and pivotally mounted on said body intermediate the ends of the blade for lateral swinging and forward and rearward movement, biasing means on said body member directly engaging the end of said blade disposed within the body member for forcing said blade forwardly and resiliently resisting said swinging movement from either side of said member, means for adjusting the pressure exerted by said biasing means, and a cutting edge on the forward projecting end of said blade.

4. A deburring tool including, in combination, a cylindrical body having a slot extending inwardly from one end and an aperture extending inwardly from the other end communicating with the slot, a blade having a slot therein disposed within the slot in the body and projecting from one end thereof, a pivot pin in the body extending through the slots in the body and the blade permitting the blade to pivot about the pin and move longitudinally of the body, the projecting end of the blade having a cutting edge, the rearward end of the blade having a recess, a plunger in the aperture having one end disposed in the blade recess for resisting the angular movement of the blade in either direction about the pivot, a spring in the aperture engaging the other end of the plunger, and a screw within the aperture for adjustably engaging the spring for varying the tension thereof.

5. A deburring tool including, in combination, a cylindrical body having a slot extending inwardly from one end and an aperture extending inwardly from the other end communicating with the slot, a blade having a slot therein disposed within the slot in the body and projecting from one end thereof, a pivot pin in the body extending through the slots in the body and the blade permitting the blade to pivot about the pin and move longitudinally of the body, the projecting end of the blade having two angularly disposed cutting edges interescting on the center line of the blade, the rearward end of the blade having a recess, a plunger in the aperture having one end disposed in the blade recess, a spring in the aperture engaging the other end of the plunger, and a screw within the aperture for adjustably engaging the spring for varying the tension thereof.

References Cited in the file of this patent

UNITED STATES PATENTS

| | | |
|---|---|---|
| 592,979 | Bartlett | Nov. 2, 1897 |
| 1,053,531 | Platt | Feb. 18, 1913 |
| 2,364,293 | Hotchner | Dec. 5, 1944 |
| 2,620,689 | Cogsdill | Dec. 9, 1952 |
| 2,628,513 | Packard | Feb. 17, 1953 |
| 2,703,996 | Reynolds et al. | Mar. 15, 1955 |
| 2,855,811 | Fried | Oct. 14, 1958 |